United States Patent

Kitahora et al.

Patent Number: 6,076,334
Date of Patent: Jun. 20, 2000

[54] SYSTEM AND METHOD FOR STERILE PACKAGING OF BEVERAGES

[75] Inventors: Nobuya Kitahora, Tokyo; Osamu Aoyagi, Kanigawa, both of Japan

[73] Assignee: The Coca-Cola Company, Atlanta, Ga.

[21] Appl. No.: 08/849,237

[22] PCT Filed: Dec. 12, 1995

[86] PCT No.: PCT/US95/16460

§ 371 Date: Jul. 31, 1997

§ 102(e) Date: Jul. 31, 1997

[87] PCT Pub. No.: WO96/18541

PCT Pub. Date: Jun. 20, 1996

[30] Foreign Application Priority Data

Dec. 12, 1994 [JP] Japan ..................................... 6/331420

[51] Int. Cl.⁷ .................................................. B65B 55/00
[52] U.S. Cl. .................. 53/426; 53/425; 53/453
[58] Field of Search ............................. 53/425, 426, 167, 53/453, 559, 561

[56] References Cited

U.S. PATENT DOCUMENTS

| | | |
|---|---|---|
| 3,325,862 | 6/1967 | Mehnert . |
| 3,785,116 | 1/1974 | Munz et al. . |
| 3,809,768 | 5/1974 | Berry . |
| 4,040,233 | 8/1977 | Valyi . |
| 4,208,852 | 6/1980 | Pioch . |
| 4,590,734 | 5/1986 | Ueda . |
| 4,880,581 | 11/1989 | Dastoli et al. . |
| 5,020,303 | 6/1991 | Vokins . |
| 5,671,591 | 9/1997 | Fleenor ................................. 53/426 X |
| 5,687,542 | 11/1997 | Lawecki et al. ....................... 53/167 X |
| 5,759,218 | 6/1998 | Martin et al. .......................... 53/425 X |
| 5,848,515 | 12/1998 | Catelli et al. .............................. 53/167 |

FOREIGN PATENT DOCUMENTS

| | | |
|---|---|---|
| 1 48262 3 | 8/1971 | Germany . |
| 6 2442 3 | 2/1994 | Japan . |
| 2 26347 2 | 7/1993 | United Kingdom . |

*Primary Examiner*—Daniel B. Moon
*Attorney, Agent, or Firm*—Finnegan, Henderson, Farabow, Garrett & Dunner, L.L.P.

[57] ABSTRACT

A system and method for sterile packaging of beverages in plastic containers forms the plastic containers and fills them with sterile beverages in a common sterile environment. The containers are formed from a blow molding process in which the containers reach elevated temperatures sufficient to at least inpart sterilize the interior of the containers, are filled with sterile beverages immediately after the containers are formed in the same sterile environment. This eliminates the need for heavy use of sterilizing fluids for the plastic containers such as hydrogen peroxide or the like.

5 Claims, 1 Drawing Sheet

6,076,334

SYSTEM AND METHOD FOR STERILE PACKAGING OF BEVERAGES

BACKGROUND OF THE INVENTION

The present invention relates to a method and system for sterile packaging of beverages. More specifically, the invention relates to a beverage packaging system and method for filling sterile beverages in plastic containers while forming the container in a sterile environment.

At present, plastic containers such as PET bottles are widely used as the containers for packaging beverages such as coffee drinks, teas, colas or juices. When a beverage is filled in these plastic containers, such beverages are sterilized in accordance with a UHT (ultra high temperature) sterilization treatment or the like and then, are filled in the sterilized plastic container, and the containers are sealed with sterilized caps.

Hitherto, plastic containers have been produced in separate bottle manufacturing plants and beverages have been filled in plastic containers in separate filling plants (bottlers) different from the bottle manufacturing plant. Accordingly, plastic containers are usually exposed to the open air from the time when these containers have been produced in any bottle manufacturing plant until the time when they have been transported to any filling plant, where the beverages have been filled. Thus, it was necessary to treat the plastic containers for sterilization after container manufacture and prior to filling the beverage in the plastic container.

Known methods for sterilizing plastic containers utilize hydrogen peroxide or an aqueous mixture of hydrogen peroxide. In case of the sterilization with hydrogen peroxide it is necessary to minimize residual amounts of hydrogen peroxide in the plastic containers. This involves technical problems and long periods of time must be taken for washing after sterilization.

SUMMARY OF THE INVENTION

An object of the present invention is to provide a beverage packaging system or method enabling one to omit any sterilization treatment of plastic containers at the time of filling beverages or to significantly curtail this sterilization treatment.

According to the present invention, the objects are fulfilled by providing a beverage packaging system comprising a resin supplier unit, a preform molding machine for molding a preform, a blow molding machine for molding a container by inflating the preform, a beverage supply source for supplying a sterilized beverage, a cap supplier unit, a cap sterilizer unit for sterilizing the cap supplied from the cap supplier unit, a filler unit for filling the sterilized beverage supplied from the beverage supply source in a plastic container molded by means of the blow molding machine and a cap clamping unit for sealing the plastic container filled with the beverage by means of the filler unit with the sterilized cap supplied from the cap sterilizer unit, said packaging system being characterized in that said blow molding machine, filler unit, cap sterilizer unit and cap clamping unit are arranged within a sterile chamber.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

The sole

DETAILED DESCRIPTION OF PREFERRED EMBODIMENTS

Figure 1:
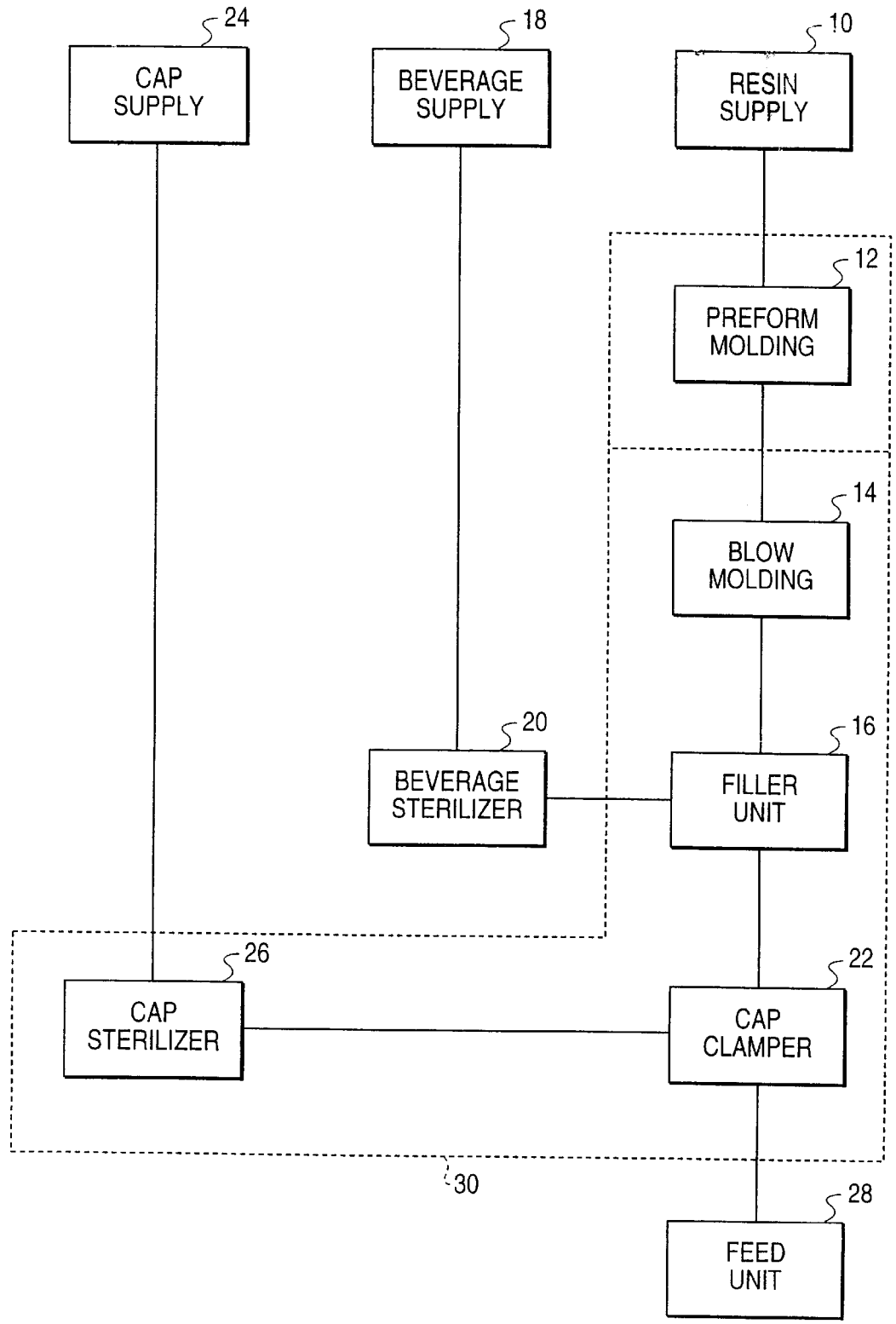
FIG. 1 is a block diagram illustrating the preferred embodiment of the beverage sterilization and packaging system of the present invention.

The beverage packaging system and method according to the present invention will be explained by referring to FIG. 1. In this working example, there is used PET (polyethylene terephthalate) as the container material. However, other plastic materials such as polyethylene naphthalate, polypropylene, polyethylene, polycarbonate, nylon, etc. can be also used.

In this beverage packaging system, PET material is supplied to a preform molding machine 12 from a resin supplier unit 10. The preform molding machine works to form a test tube-shaped preform, for example, in accordance with an injection molding method, an extrusion molding method, etc. In the case of using PET, the temperature at which the preform is molded is in a range of 260°~280° C., for instance. Accordingly, the interior of the molded preform is inherently in a state of being heat sterilized.

The molded preform is fed to a blow molding machine 14 and pressurized air is supplied into the preform whereby the preform is inflated to form a plastic container. In the case of using PET, the temperature of the container immediately after blow molding is in a range of 50°~95° C., for instance. Where any other plastic material has been used, there are some cases where the temperature of the container immediately after blow molding is somewhat higher than the above temperature range.

In this working example the preform molding machine 12 and the blow molding machine 14 are constructed as distinct units arranged by connecting them directly. Instead, such construction is possible that the preform molding machine 12 and the blow molding machine 14 are arranged separately and a preform molded by means of the preform molding machine 12 is transported to the blow molding machine 14 through any known means.

Preferably, the preform molding machine 12 and the blow molding machine 14 are constructed as distinct units arranged by connecting them directly, as above. More preferably, these units are constructed with an integral molding machine such as an injection blow molding machine or extrusion blow molding machine. For instance, where using the injection blow molding machine, the preform molding is conducted by using a neck mold, a core mold and a cavity mold and the blow molding is performed by using the neck mold and the blow mold both employed in the preform molding.

PET bottles molded as above are supplied to a filler unit 16.

Beverages are supplied to a beverage sterilizer unit 20 from a beverage supply unit 18 for supplying beverages such as coffee drinks, teas, colas or juices. And these beverages are subjected to a UHT sterilization treatment, for example.

In this working example the sterilized beverages are supplied to the filler unit 16 from a beverage supply source constructed with the beverage supply unit 18 and the beverage sterilizer unit 20. Then these beverages are filled in the PET bottles molded as above and the filled bottles are supplied to a cap clamping unit 22.

Caps which are constructed with a metal sheet and plastics or the like as in the conventional caps are supplied to a cap sterilizer 26 from a cap supply unit 24. For instance, these caps are treated for sterilization with sterilization and then are supplied to the cap clamping unit 22. In the cap clamping unit 22 the caps treated for sterilization are clamped on the PET bottles filled with beverages.

The PET bottles which are sealed with caps as in the conventional bottles are supplied to a feed unit 28. In this feed unit 28 the PET bottles are labelled and each bottle is housed in a casing, for instance. After being subjected to any necessary treatment like sampling inspection, the bottles are transported to consumers.

According to the present invention, the blow molding machine 14, filler unit 16, cap sterilizer unit 26 and cap clamping unit 22 are arranged within a sterile chamber 30.

Where the temperature at the time of the blow molding conducted in the blow molding machine 14 is relatively high, the inside of the container is inherently heat sterilized. This enables one to fill beverages in containers molded through the molding machine 14 by using these containers as such.

On the other hand, where the temperature at the time of the blow molding in the molding machine 14 is relatively low or in the case of beverages which require any especially high sterilization treatment, a container sterilizer unit and a washing unit or the like are installed between the blow molding machine 14 and the filler unit 16. Also in this case, the interior of a plastic container is put in a high-temperature state in the blow molding machine 14, in consequence of which the sterilization treatment can be fairly reduced, compared with a conventional example in which the container molding and the beverage filling are conducted separately. Accordingly, it is possible to significantly reduce an amount of any agent used at the time of the plastic container sterilization. This enables one to drastically reduce the plastic container sterilization cost. Moreover, since the sterilization treatment can be curtailed in this way, it is possible to make an arrangement of space of the whole filler unit fairly small.

Further, the temperature of a container immediately after its molding my means of the blow molding machine 14 is in a range of 50°~95° C., for instance. In the case of installing any container sterilizer unit, since the blow molding machine 14 and the container sterilizer unit are so arranged as to be adjacent, a high-temperature container immediately after its being molded by means of the blow molding machine 14 is to be supplied to the sterilizer unit. Therefore, when the container has been sterilization treated with an agent like hydrogen peroxide, the container is mostly heated at high temperature in order to enhance a sterilization effect. However, it becomes unnecessary to dispose any means for heating the container by arranging the blow molding machine 14 and the container sterilizer in an adjacent manner, as above.

In the preferred embodiment of the present invention, the preform molding machine 12, blow molding machine 14, filler unit 16, cap sterilizer unit 26 and cap clamping unit 22 are arranged within the sterile chamber 30.

As above, in the preform molding machine 12, a plastic material is treated at fairly high temperatures thereby to form a preform. Accordingly, the preform is put in a state of being heat sterilized. Even if this has been treated by means of the blow molding machine 14, the interior of its formed container is maintained in a sterilized state. Accordingly, beverages can be filled by means of the filler unit 16 without any necessity to additionally sterilization treat the container supplied from the blow molding machine 14.

Naturally, with various temperature conditions or necessary sterilization conditions taken into consideration a sterilizer unit, a washing unit, etc. are installed between the blow molding machine 14 and the filler unit 16, for example. However, as above, the preform molding machine 12, blow molding machine 14, filler unit 16, etc. are arranged within the sterile chamber 30. This enables one to substantially curtail the sterilization treatment.

Further, the sterile-state grade or level of the sterile chamber 30 is selected by considering the beverages to be filled, container production step, etc. Moreover, it is possible to construct this sterile chamber 30 with plural portions having different grades or levels. For instance, the preform molding machine 12 and/or the blow molding machine 14, etc. can be constructed with a sterile chamber (a so-called clean room) having a relatively low grade and any other portion can be constructed with a sterile chamber having a high grade.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of sterile packaging of beverages comprising the steps of:
    Providing a chamber with different, discrete, portions to form a sterile environment;
    molding a preform in a first one of the discrete portions;
    forming a container within a second one of the discrete portions of the sterile environment by blow molding the preform to form the container;
    providing a source of sterile beverage in a third one of the discrete portions;
    filling the container with the sterile beverage after blow molding the container, the container being filled in the third one of the discrete portions of the chamber;
    sealing the container so filled with a sterilized cap while the container is in a fourth one of discrete portions of the sterile environment; and
    controlling different degrees of sterility in the different discrete portions of the chamber, each degree of sterility being correlated to the degree required for the method step being performed in that different discrete portion of the chamber.

2. The method of claim 1, wherein the step of blow molding heats the container to a sufficient temperature to sterilize the interior of the container.

3. The method of claim 1, wherein the preform is injection molded in the sterile environment.

4. The method of claim 3, further comprising the steps of:
    supplying caps to the sterile environment, and
    sterilizing the caps within one of the different discrete compartments of the sterile environment whereafter the caps are sealed to the container during the step of sealing.

5. The method of claim 1, further comprising the steps of:
    supplying caps to the sterile environment, and
    sterilizing the caps within one of the different discrete compartments of the sterile environment whereafter the caps are sealed to the container during the step of sealing.

\* \* \* \* \*

UNITED STATES PATENT AND TRADEMARK OFFICE
CERTIFICATE OF CORRECTION

PATENT NO. : 6,076,334
DATED : June 20, 2000
INVENTOR(S) : KITAHORA et al.

It is certified that error appears in the above-identified patent and that said Letters Patent is hereby corrected as shown below:

TITLE PAGE, Item [57], L. 6 of Abstract, "inpart" should read --in part--.

CLAIM 1, Col. 4, L. 29, "Providing" should read --providing--.

Signed and Sealed this

First Day of May, 2001

Attest:

NICHOLAS P. GODICI

Attesting Officer

Acting Director of the United States Patent and Trademark Office